United States Patent
Ryf

(10) Patent No.: US 8,391,655 B2
(45) Date of Patent: Mar. 5, 2013

(54) WAVEGUIDE COUPLER FOR OPTICAL TRANSVERSE-MODE MULTIPLEXING

(75) Inventor: Roland Ryf, Aberdeen, NJ (US)

(73) Assignee: Alcatel Lucent, Paris (FR)

( * ) Notice: Subject to any disclaimer, the term of this patent is extended or adjusted under 35 U.S.C. 154(b) by 170 days.

(21) Appl. No.: 12/827,284

(22) Filed: Jun. 30, 2010

(65) Prior Publication Data

US 2011/0243490 A1  Oct. 6, 2011

Related U.S. Application Data

(60) Provisional application No. 61/320,934, filed on Apr. 5, 2010.

(51) Int. Cl.
*G02B 6/26* (2006.01)
*G02B 6/42* (2006.01)

(52) U.S. Cl. ............... 385/29; 385/16; 385/27; 385/28

(58) Field of Classification Search .............. 385/16, 385/28, 29
See application file for complete search history.

(56) References Cited

U.S. PATENT DOCUMENTS

| | | | |
|---|---|---|---|
| 5,379,142 A * | 1/1995 | Handa | 398/79 |
| 6,525,853 B1 | 2/2003 | Stuart | |
| 6,668,108 B1 | 12/2003 | Helkey et al. | |
| 6,797,983 B2 | 9/2004 | Chen et al. | |
| 6,909,528 B2 | 6/2005 | Korzinin et al. | |
| 6,940,577 B2 | 9/2005 | Kozhukh | |
| 7,194,155 B1 | 3/2007 | Kahn et al. | |
| 7,268,852 B2 | 9/2007 | Kuan et al. | |
| 7,315,575 B2 | 1/2008 | Sun et al. | |
| 7,323,275 B2 | 1/2008 | Otaki et al. | |
| 7,327,914 B1 | 2/2008 | Kahn et al. | |
| 7,416,818 B2 | 8/2008 | Sutherland et al. | |
| 7,674,028 B2 * | 3/2010 | Cassarly et al. | 362/600 |
| 7,844,144 B2 * | 11/2010 | Kahn et al. | 385/15 |
| 2002/0003923 A1 | 1/2002 | Ranka et al. | |
| 2003/0103718 A1 * | 6/2003 | Chen | 385/22 |
| 2005/0046865 A1 | 3/2005 | Brock et al. | |
| 2005/0213075 A1 | 9/2005 | Cooke | |
| 2007/0247687 A1 | 10/2007 | Handschy et al. | |
| 2007/0297806 A1 | 12/2007 | Kaneda et al. | |
| 2008/0069561 A1 * | 3/2008 | Kahn et al. | 398/39 |
| 2008/0273560 A1 * | 11/2008 | Stelmakh | 372/26 |
| 2009/0129787 A1 | 5/2009 | Li et al. | |
| 2009/0169220 A1 * | 7/2009 | Kahn et al. | 398/200 |
| 2009/0244415 A1 * | 10/2009 | Ide | 349/33 |
| 2010/0138722 A1 | 6/2010 | Harley et al. | |

(Continued)

FOREIGN PATENT DOCUMENTS

GB  2 399 963 A  9/2004

OTHER PUBLICATIONS

U.S. Appl. No. 12/827,641, filed Jun. 30, 2010.

(Continued)

*Primary Examiner* — Rhonda Peace

(74) *Attorney, Agent, or Firm* — Mendelsohn, Drucker & Associates, P.C.; Yuri Gruzdkov; Steve Mendelsohn

(57) ABSTRACT

An optical coupler for coupling a multimode waveguide and two or more other waveguides. In one embodiment, the optical coupler has an optical phase mask disposed between the multimode waveguide and two or more other waveguides. The optical phase mask imposes on the light passing therethrough a spatial phase pattern that causes selective mode-to-waveguide coupling between the multimode waveguide and the other waveguides. The optical coupler can be used, e.g., in transmitters and receivers of optical transverse-mode-multiplexed signals.

19 Claims, 7 Drawing Sheets
(2 of 7 Drawing Sheet(s) Filed in Color)

U.S. PATENT DOCUMENTS

| | | | |
|---|---|---|---|
| 2010/0142971 | A1 | 6/2010 | Chang et al. |
| 2010/0158521 | A1 | 6/2010 | Doerr et al. |
| 2010/0290738 | A1 | 11/2010 | Yan et al. |
| 2010/0296819 | A1 | 11/2010 | Kahn et al. |
| 2010/0329670 | A1* | 12/2010 | Essiambre et al. ............... 398/43 |
| 2010/0329671 | A1* | 12/2010 | Essiambre et al. ............... 398/44 |
| 2011/0150503 | A1 | 6/2011 | Winzer |
| 2011/0243490 | A1* | 10/2011 | Ryf ................................... 385/1 |
| 2011/0243574 | A1* | 10/2011 | Essiambre et al. ............ 398/200 |

OTHER PUBLICATIONS

Rene'-Jean Essiambre et al, "Transverse-Mode Multiplexing for Optical Communication Systems," U.S. Appl. No. 12/492,399, filed Jun. 26, 2009.

Rene'-Jean Essiambre et al, "Receiver for Optical Transverse-Mode-Multiplexed Signals," U.S. Appl. No. 12/492,391, filed Jun. 26, 2009.

Gloge, D., "Weakly Guiding Fibers," Applied Optics, vol. 10, No. 10, Oct. 1971, pp. 2252-2258.

Robinson, M.G. et al. "Polarization Engineering for LCD Projection," Wiley, Chichester (England), 2005, Chapter 11, pp. 257-275.

Hsu, Rick C. J. et al., "Capacity Enhancement in Coherent Optical MIMO (COMIMO) Multimode Fiber Links," IEEE Communications Letters, vol. 10, No. 3, Mar. 2006, pp. 195-197.

Tarighat, Alireza et al., "Fundamentals and Challenges of Optical Multiple-Input Multiple-Output Multimode Fiber Links," Topics in Optical Communications, IEEE Communications Magazine, May 2007, pp. 57-63.

Hsu, Rick C. J. et al., "Coherent Optical Multiple-Input Multiple-Output communication," IEICE Electronics Express, vol. 1, No. 13, 2004, pp. 392-397.

Shah, Akhil R. et al., "Coherent Optical MIMO (COMIMO)," Journal of Lightwave Technology, vol. 23, No. 8, Aug. 2005, pp. 2410-2419.

Shieh, William., "High Spectral Efficiency Coherent Optical OFDM for 1 Tb/s Ethernet Transport," OWW1.pdf, OCIS codes: (060 2330) Fiber optics communications; (060. 1660) Coherent Communications, 2009, 3 pages.

Guofeng, Wu., "Methods of Increasing the Bandwidth-Distance Product for Multimode Fibers in LAN." Journal of Optical Communications, vol. 29, Jan. 1, 2008, pp. 213-216.

"Fourier optics", Wikipedia,the free encyclopedia, "http://en.wikipedia.org/wiki/Fourier_optics", downloaded Aug. 31, 2011, 20 pages.

Jalali, et al., "Coherent Optical MIMO," 2005; Proc. of SPIE; vol. 5814; pp. 121-127.

O'Callaghan, et al., "Spatial Light Modulators with Integrated Phase Masks for Holographic Data Storage," 2006; IEEE; pp. 23-25.

Lin, et al., "Holographic Fabrication of Photonic Crystals Using Multidimensional Phase Masks," Dec. 2008; Journal of Applied Physics.

Stuart, H., "Dispersive Multiplexing in Multimode Optical Fiber," 2000; Science Magazine; pp. 281-283.

Notice of Allowance; Mailed on Aug. 21, 2012 for corresponding U.S. Appl. No. 12/492,391.

* cited by examiner

100

400

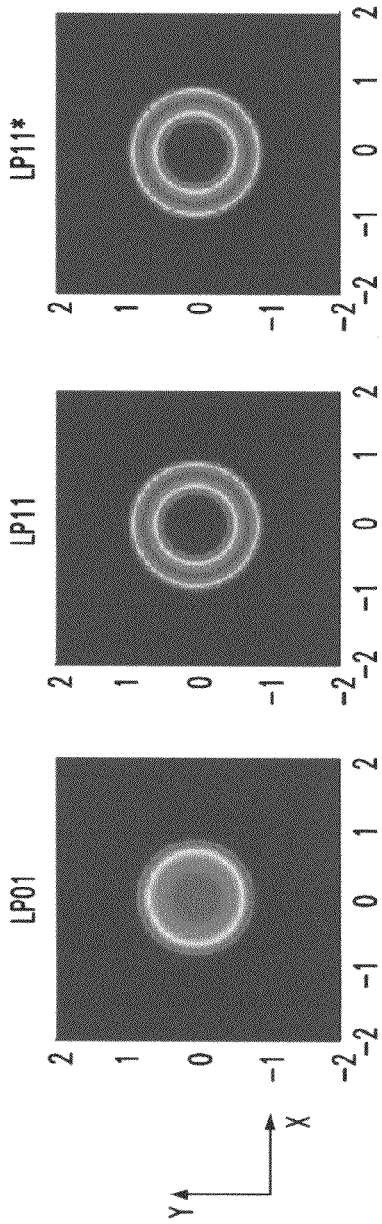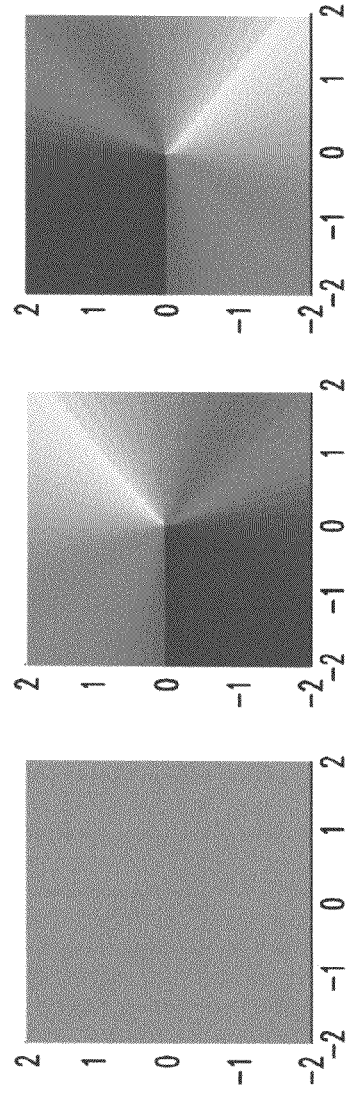

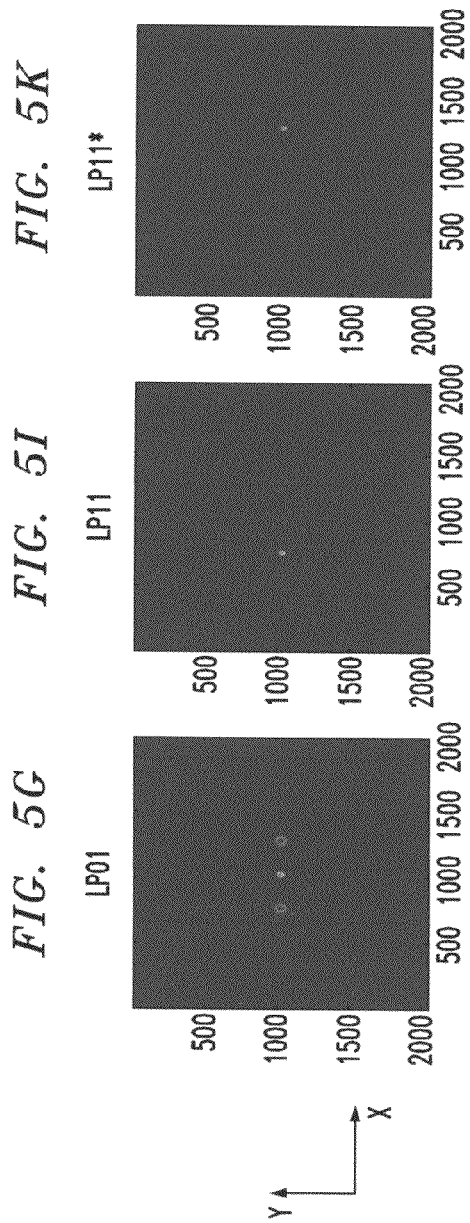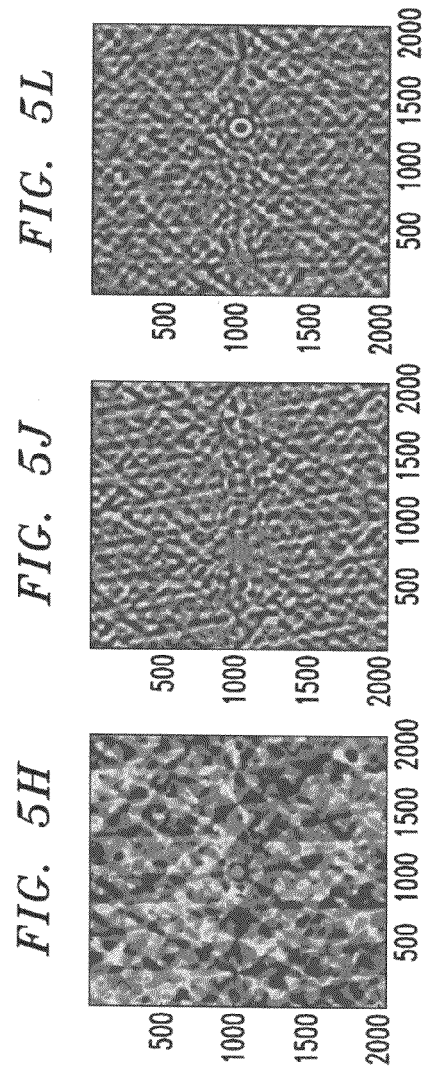

600

WAVEGUIDE COUPLER FOR OPTICAL TRANSVERSE-MODE MULTIPLEXING

CROSS-REFERENCE TO RELATED APPLICATIONS

This application claims priority from and the benefit of (1) U.S. Provisional Patent Application No. 61/320,934 filed on Apr. 5, 2010, and (2) U.S. Provisional Patent Application No. 61/321,013 filed on Apr. 5, 2010, both of which are incorporated herein by reference in their entirety.

The subject matter of this application is related to the subject matter of: (1) U.S. patent application Ser. No. 12/492,399, filed on Jun. 26, 2009, and entitled "Transverse-Mode Multiplexing for Optical Communication Systems" and (2) U.S. patent application Ser. No. 12/492,391, filed on Jun. 26, 2009, and entitled "Receiver for Optical Transverse-Mode-Multiplexed Signals," both of which are incorporated herein by reference in their entirety.

The subject matter of this application is also related to the subject matter of U.S. patent application Ser. No. 12/827,641, by Rene'-Jean Essiambre, Christopher Richard Doerr, and Roland Ryf, filed on the same date as the present application, and entitled "Multimode Optical Communication," which is incorporated herein by reference in its entirety.

BACKGROUND

1. Field of the Invention

The present invention relates to optical communication equipment and, more specifically but not exclusively, to the equipment that enables transverse-mode multiplexing (TMM) in optical communication systems.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Wireless communication systems with multiple-input multiple-output (MIMO) capabilities increase the overall transmission capacity by exploiting (instead of trying to mitigate) the multi-path delay spread in a wireless channel. More specifically, wireless MIMO improves efficiency and reliability through the use of multiple antennas at the transmitter and receiver. The resulting increase in average throughput is realized at the expense of greater complexity in signal processing and hardware implementation, but not at the expense of additional spectral bandwidth or higher signal power.

In optical communication systems, a MIMO approach to increasing the transmission capacity is feasible, for example, because modal dispersion in a multimode fiber is analogous to multi-path delay in a wireless transmission medium. Consequently, optical MIMO can be leveraged to exploit the inherently high transmission capacity of multimode fibers. However, the hardware for implementing optical MIMO is not yet sufficiently developed.

SUMMARY

Disclosed herein are various embodiments of an optical coupler for coupling a multimode waveguide and two or more single-mode waveguides. In one embodiment, the optical coupler has an optical phase mask disposed between the multimode waveguide and the single-mode waveguides. The optical phase mask imposes on the light passing therethrough a spatial phase pattern that causes selective mode-to-waveguide coupling between the multimode waveguide and the single-mode waveguides. The optical coupler can be used, e.g., in transmitters and receivers of optical transverse-mode-multiplexed (TMM) signals.

According to one embodiment, provided is an optical apparatus having a first port for a first multimode waveguide, a second port for a plurality of second waveguides, and an optical phase mask. The optical phase mask is disposed between the first port and the second port for optically coupling the first multimode waveguide and the plurality of second waveguides so that different transverse modes of the multimode waveguide are coupled to different respective waveguides of the plurality of second waveguides.

According to another embodiment, provided is an optical apparatus having a first port for a first multimode waveguide, a second port for a plurality of second waveguides, and an optical phase mask. The optical phase mask is disposed between the first port and the second port for optically coupling the first multimode waveguide and the plurality of second waveguides so that different linear combinations of transverse modes of the multimode waveguide are coupled to different respective waveguides of the plurality of second waveguides.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Other aspects, features, and benefits of various embodiments of the invention will become more fully apparent, by way of example, from the following detailed description and the accompanying drawings, in which:

FIGS. 5A-L illustrate the operation of the optical coupler of FIG. 3 when the coupler has the phase mask of FIG. 4.

DETAILED DESCRIPTION

Figure 1:
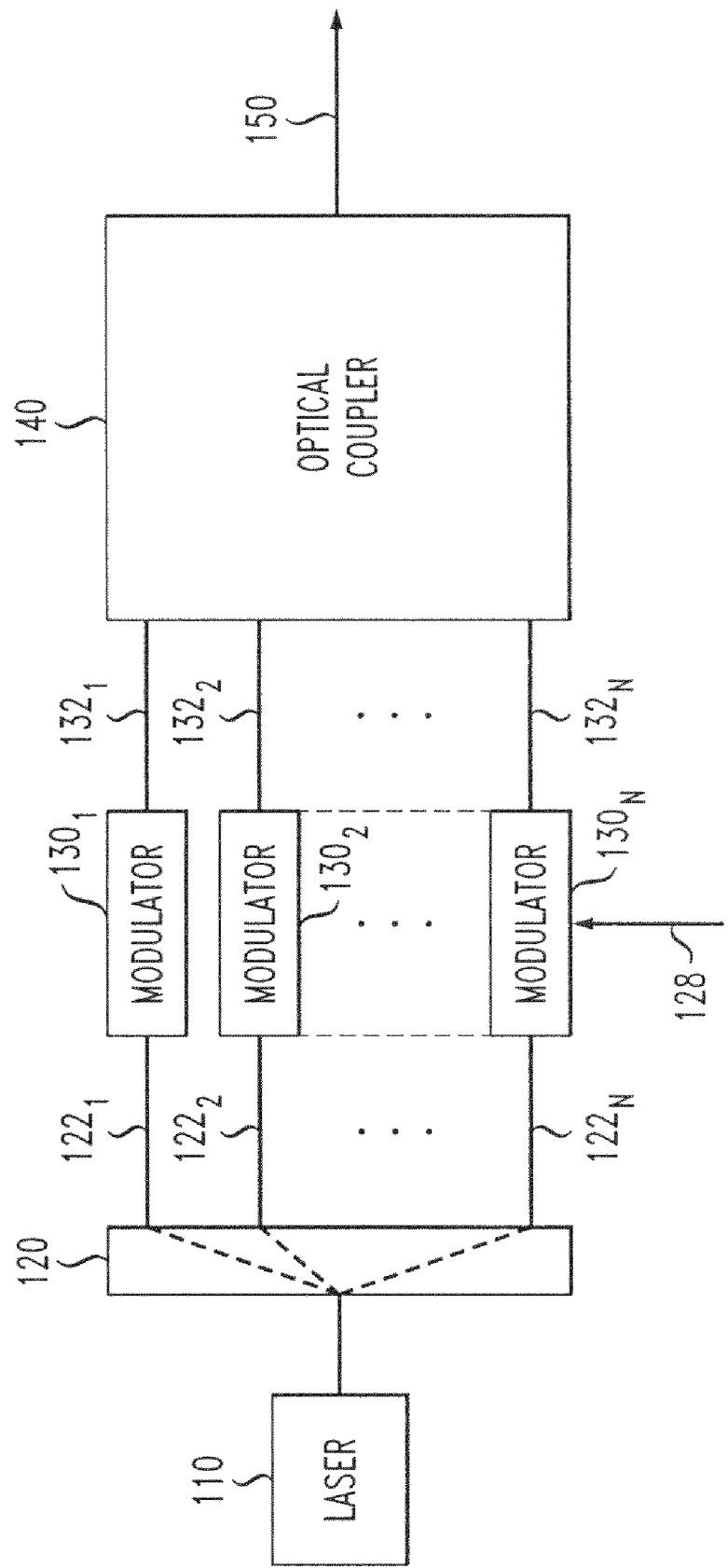
FIG. 1 shows a block diagram of an optical transmitter according to one embodiment of the invention.

FIG. 1 shows a block diagram of an optical transmitter 100 according to one embodiment of the invention. Transmitter 100 is designed to generate optical transverse-mode-multiplexed (TMM) signals and launch them into a multimode fiber 150 for transmission to a remote receiver (not explicitly shown in FIG. 1). In one embodiment, multimode fiber 150 supports up to about one hundred different transverse modes. In an alternative embodiment, multimode fiber 150 supports up to more than one hundred different transverse modes.

As used herein, the term "transverse mode" refers to a guided electromagnetic wave having an electric- or magnetic-field distribution (hereafter referred to as an optical-field distribution), in a plane perpendicular (i.e. transverse) to the propagation direction, that is substantially independent of the propagation distance. More specifically, if any loss or gain of optical power in the fiber is factored out, then the mode's optical-field distributions measured at two different locations along the fiber will differ only by a factor that reflects the overall phase change accrued by the mode between those two locations. Each transverse mode is an eigenmode of the fiber, and different transverse modes are mutually orthogonal in that the spatial cross-correlation between any two different transverse modes is zero. In general, a given optical fiber can support up to a fixed, maximum number of transverse modes whose optical-field distributions and propagation constants are determined by the waveguide structure, material properties, and optical frequency (wavelength). Note that the concept of transverse modes is applicable to various types of optical waveguides, e.g., multimode fibers, multi-core fibers, and on-chip waveguides used in opto-electrical integrated circuits.

Transmitter 100 has a laser 110 configured to generate an output light beam of a designated wavelength. A beam splitter 120 spits the beam generated by laser 110 N ways and couples the resulting N beams into N single-mode fibers 122, where N is an integer greater than one. Each fiber 122 directs its respective beam to a corresponding optical modulator 130, where that beam is modulated with data supplied to the modulator via a control signal 128. Note that different modulators 130 or suitable modulator arrangements can modulate their respective optical beams using different independent or correlated data streams derived from control signal 128. In a representative configuration, each modulator 130 modulates its optical beam based on a corresponding independent data stream intended for transmission from transmitter 100 to a corresponding remote receiver. The modulated optical signals produced by modulators 130 serve as independently modulated components of a TMM signal that is applied by transmitter 100 to multimode fiber 150.

Transmitter 100 further has an optical coupler 140 that receives, via N single-mode fibers 132, the N modulated optical signals produced by modulators 130 and properly couples these signals into multimode fiber 150. More specifically, each modulated optical signal received by optical coupler 140 is selectively coupled substantially into a single selected transverse mode of multimode fiber 150, with different modulated optical signals being coupled into different transverse modes. When an individual optical signal is selectively coupled by optical coupler 140 substantially into a single transverse mode of multimode fiber 150 at a proximate terminus of that fiber and is thereby transformed into an optical component of a TMM signal that is launched into the multimode fiber, it is said that that optical component of the TMM signal "corresponds to a single transverse mode of the multimode fiber at the proximate terminus of the multimode fiber."

In one embodiment of transmitter 100, the number N is chosen to be the same as the maximum number of transverse modes supported by multimode fiber 150. In other words, this embodiment of transmitter 100 employs optical coupler 140 that is capable of populating each and every one of the supported transverse modes of multimode fiber 150 with a respective independently modulated optical signal. Additional details on various embodiments and operation of transmitter 100 can be found in the above-cited U.S. patent application Ser. Nos. 12/492,391 and 12/492,399.

It is known in the art that transverse modes of a multimode fiber undergo inter-mode mixing as they propagate along the length of the fiber. As a result, even if a communication signal is completely confined to a particular single transverse mode at the front end of a multimode fiber, other transverse modes will have contributions from that communication signal at the remote end of the fiber. Hence, a significant amount of signal processing needs to be performed at the receiver to fully recover the data carried by different independently modulated components of a TMM signal. In general, to decode N independently modulated components of a TMM signal, the receiver needs to obtain at least N independent samples of the signal. The signal processing applied to these samples is generally based on matrix-diagonalization algorithms aimed at reversing the effects of inter-mode mixing in the multimode fiber.

Figure 2:
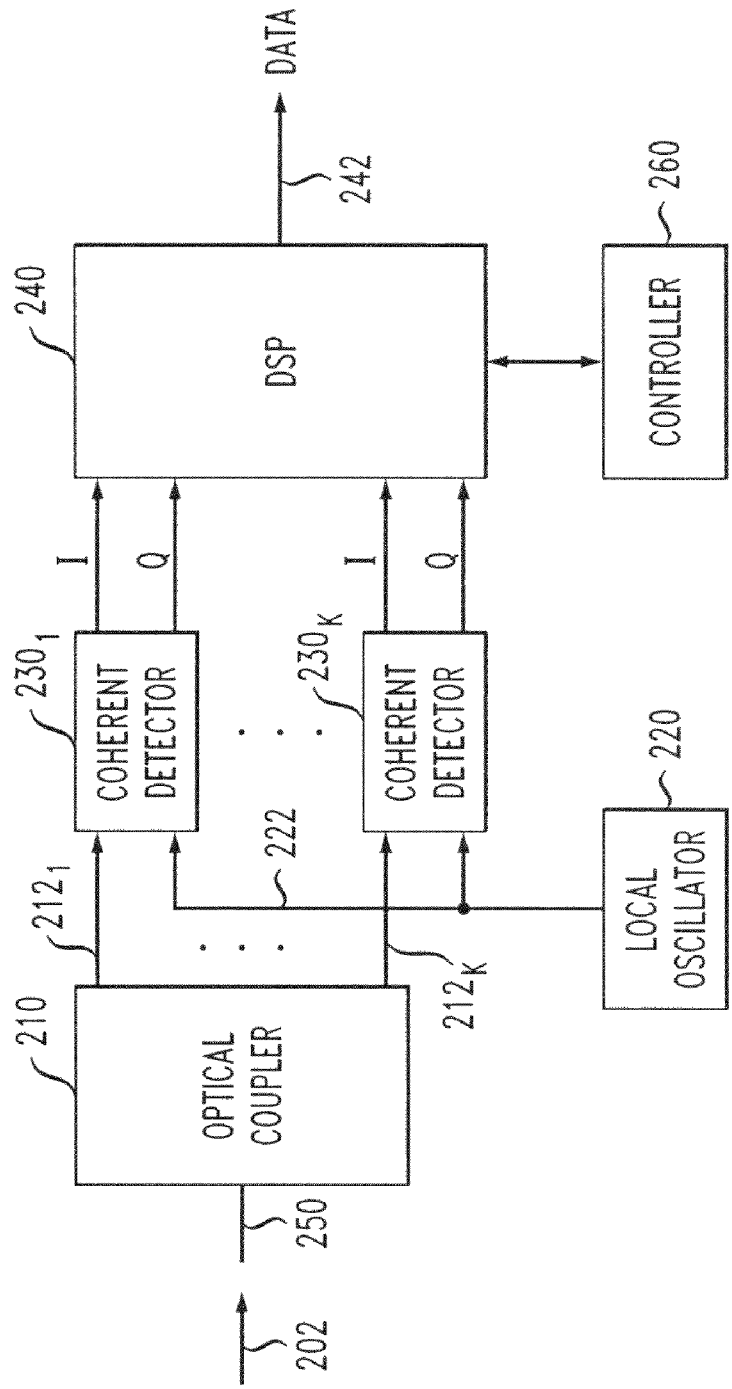
FIG. 2 shows a block diagram of an optical receiver according to one embodiment of the invention.

FIG. 2 shows a block diagram of an optical receiver 200 according to one embodiment of the invention. Receiver 200 is designed to receive and decode optical TMM signals to recover the data encoded onto individual TMM components at a remote transmitter (not explicitly shown in FIG. 2). In one configuration, receiver 200 can be operationally coupled to transmitter 100 (FIG. 1).

Receiver 200 has an optical coupler 210 configured to receive, from a multimode fiber 250, an input TMM signal 202. Optical coupler 210 produces K optical samples of TMM signal 202 and couples these optical samples into K corresponding single-mode fibers 212, where K is a positive integer greater than one. Each of the optical samples carried by fibers 212 is coherently detected by a corresponding coherent detector 230 using an optical local-oscillator (LO) signal 222 supplied by a local-oscillator source 220. The electrical-domain detection results generated by each individual coherent detector 230, e.g., an in-phase component I and a quadrature-phase component Q of the corresponding optical sample, are applied to a digital signal processor (DSP) 240. For each signaling interval (e.g., bit period), DSP 240 appropriately processes a full set of detection results generated by coherent detectors $230_1$-$230_K$ to generate an output data stream 242. Provided that optical coupler 210 produces enough samples of TMM signal 202, DSP 240 is able to recover and output, via stream 242, all the data that have been originally encoded by the remote transmitter onto the TMM signal that is received by receiver 200 as TMM signal 202.

One skilled in the art will understand that one function of DSP 240 is to invert the mode-mixing matrix corresponding to the optical link between the remote transmitter and receiver 200. In general, link conditions change over time, thereby causing the mode-mixing matrix to change as well, usually on a millisecond time scale or slower. In one embodiment, DSP 240 is configured to adaptively follow link-condition variations. For example, DSP 240 can employ, as known in the art, blind adaptation algorithms to learn the link conditions and to adapt to them. Alternatively or in addition, from time to time, a controller 260 coupled to DSP 240 might request that the remote transmitter send to receiver 200 a training sequence for the DSP to obtain the current mode-mixing matrix. Additional details on various embodiments and operation of receiver 200 can be found in the above-cited U.S. patent application Ser. Nos. 12/492,391 and 12/492,399.

Figure 3:
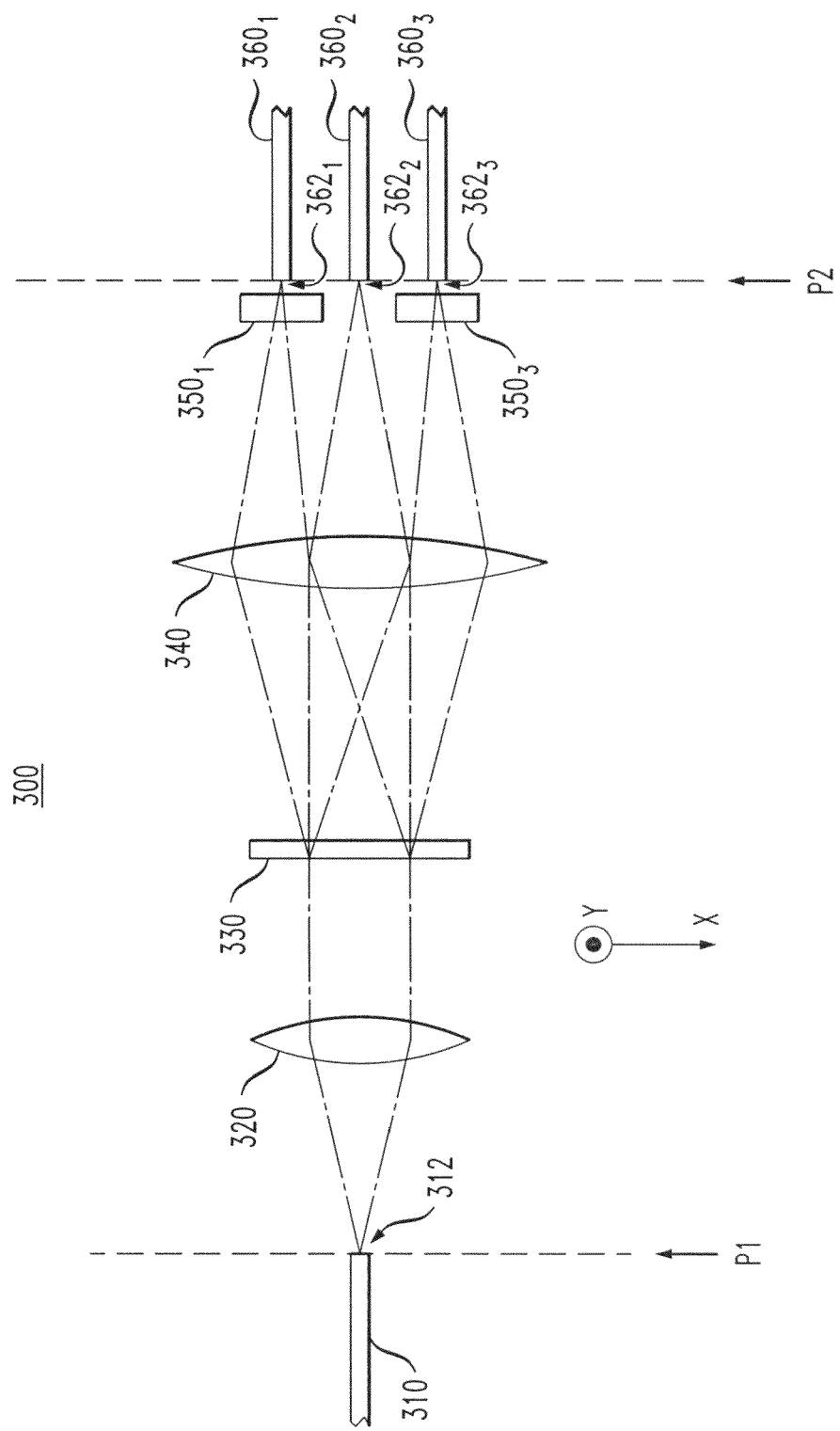
FIG. 3 shows a block diagram of an optical coupler that can be used in the optical transmitter of FIG. 1 and/or the optical receiver of FIG. 2 according to one embodiment of the invention.

FIG. 3 shows a block diagram of an optical coupler 300 that can be used as optical coupler 140 (FIG. 1) and/or optical coupler 210 (FIG. 2) according to one embodiment of the invention. If optical coupler 300 is configured to operate as optical coupler 140 (FIG. 1), then, in the view shown in FIG. 3, the corresponding optical signals flow through the coupler from the right side to the left side of the figure, i.e., from single-mode fibers 360 to a multimode fiber 310. Alternatively, if optical coupler 300 is configured to operate as optical coupler 210 (FIG. 2), then the corresponding optical signals flow through the coupler from the left side to the right side of the figure, i.e., from multimode fiber 310 to single-mode fibers 360. For clarity, the operation of optical coupler 300 is described below only in reference to the latter flow direction, i.e., from multimode fiber 310 to single-mode fibers 360. From this description, one of ordinary skill in the art will readily understand the operation of optical coupler 300 for the opposite flow direction, i.e., from single-mode fibers 360 to multimode fiber 310.

Although optical coupler 300 is shown in FIG. 3 as having three single-mode fibers 360, one of ordinary skill in the art will appreciate that, in other embodiments, the optical coupler can have a different number (e.g., only two or more than three) of single-mode fibers 360. In various embodiments, single-mode fibers 360 can be arranged to form a linear array or a two-dimensional array. As used herein, the term "array" refers to any spatial distribution of analogous objects, such as fibers or waveguides. The term "array" should not be construed as implying a periodic or symmetric arrangement only, such as an arrangement corresponding to a rectangular grid. In one embodiment, single-mode fibers 360 can be replaced by an array of single-mode waveguides whose termini are located at a peripheral side (edge) of the corresponding optical-waveguide circuit. Alternatively or in addition, multimode fiber 310 can similarly be replaced by a multimode waveguide that is part of another or the same optical-waveguide circuit.

In one embodiment, multimode fiber 310 and/or single-mode fibers 360 are removable and optical coupler 300 has appropriate mechanical means (e.g., fiber holders or ports) for securing the removable fibers in their proper positions. The mechanical means can be adjustable, e.g., to enable fine tuning of the alignment of fibers in optical coupler 300. If optical coupler 300 is designed for use with waveguide circuits, then the mechanical means are appropriately designed to accommodate such waveguide circuits.

Optical coupler 300 employs lenses 320 and 340 and a phase mask 330 positioned between the lenses to provide desired optical coupling between multimode fiber 310 and single-mode fibers 360. In various embodiments, each of lenses 320 and 340 can be an appropriate single lens or a multi-lens arrangement. The (effective) focal lengths of lenses 320 and 340 can be the same or different. In one possible configuration, lens 320 is positioned to be equidistant from phase mask 330 and plane P1, with each of the distances being approximately equal to the focal length of lens 320. Note that plane P1 passes through a proximate terminus 312 of multimode fiber 310 and is parallel to the XY plane of FIG. 3. Similarly, in that configuration, lens 340 is positioned to be equidistant from phase mask 330 and plane P2, with each of the distances being approximately equal to the focal length of lens 340. Note that plane P2 passes through proximate termini 362 of single-mode fibers 360 and is parallel to the XY plane.

Phase mask 330 imposes a phase pattern that is specifically designed to cause selective mode-to-waveguide coupling for fibers 310 and 360. As used herein, the term "selective mode-to-waveguide coupling" refers to a type of optical coupling in which: (1) a plurality of single-mode or multimode waveguides is optically coupled to a single multimode waveguide; (2) for a selected mode of the single multimode waveguide, the optical energy is efficiently transferred between that particular mode and a corresponding one of the waveguides of the plurality; and (3) optical-energy transfer between that selected mode and the other waveguides of the plurality is significantly less efficient than (e.g., negligible compared to) the energy transfer specified in (2). Table 1 that is presented below after the description of FIG. 5 provides representative examples of coupling efficiencies that can be used to quantify the term "significantly less efficient" used in (3). In general, for any transverse mode, the coupling efficiency corresponding to the intended waveguide exceeds the (parasitic) coupling efficiency corresponding to any unintended waveguide by a specified, acceptably large factor, e.g., a factor of 10, a factor of 50, or a factor of 100. One skilled in the art will appreciate that the type of application, for which optical coupler 300 is used, will determine what value constitutes an "acceptably large factor."

For example, in one embodiment, phase mask 330 is designed to produce the following type of optical coupling between fibers 310 and 360. The optical energy of a first selected transverse mode of multimode fiber 310 is primarily transferred to single-mode fiber $360_1$, while single-mode fibers $360_2$ and $360_3$ receive very little (if any) of that energy. Similarly, the optical energy of a second selected transverse mode of multimode fiber 310 is primarily transferred to single-mode fiber $360_2$, while single-mode fibers $360_1$ and $360_3$ receive very little of that energy. Finally, the optical energy of a third selected transverse mode of multimode fiber 310 is primarily transferred to single-mode fiber $360_3$, while single-mode fibers $360_1$ and $360_2$ receive very little of that energy.

In various embodiments, phase mask 330 can be a binary phase mask, a digital phase mask, or an analog phase mask. As known in the art, a digital phase mask is a phase mask that can locally impose only one of a finite number of discrete phase shifts, e.g., $2\pi m/n$, where n is a positive integer greater than 1, and m is an integer that satisfies $0 \leq m < n$. A binary phase mask is a digital phase mask with n=2. An analog phase mask is different from a digital phase mask in that different portions of an analog phase mask can impose phase shifts selected from a continuous phase-shift range, rather than from a discrete set.

In one embodiment, phase mask 330 is a relatively thin plate made of a suitable dielectric and/or semiconductor material(s). In an alternative embodiment, phase mask 330 is a spatial light modulator (SLM), such as a liquid-crystal-on-silicon (LCOS) SLM. Since an SLM is a (re)configurable device, it can be used to dynamically change the displayed patterns. This feature can be useful, e.g., to enable a relatively easy change of the transverse-mode assignments for different single-mode fibers 360 or additionally reconfigure the phase mask to support different modes of multimode fiber 310 or the modes of a different multimode fiber. In various embodiments phase mask 330 can be designed to impose "pure" spatial phase modulation or a combination of spatial phase and spatial amplitude modulation. In one embodiment, phase mask 330 is a single unitary piece.

In certain embodiments, optical coupler 300 uses one or more optional amplitude and/or phase (A/P) filters 350, each placed next to terminus 362 of the corresponding single-mode fiber 360. For some transverse modes, the use of an appropriate A/P filter 350 helps to increase the coupling efficiency between the mode and the corresponding single-mode fiber 360. Additional description of a representative A/P filter 350 is given below, e.g., in reference to FIG. 5J.

Figure 4:
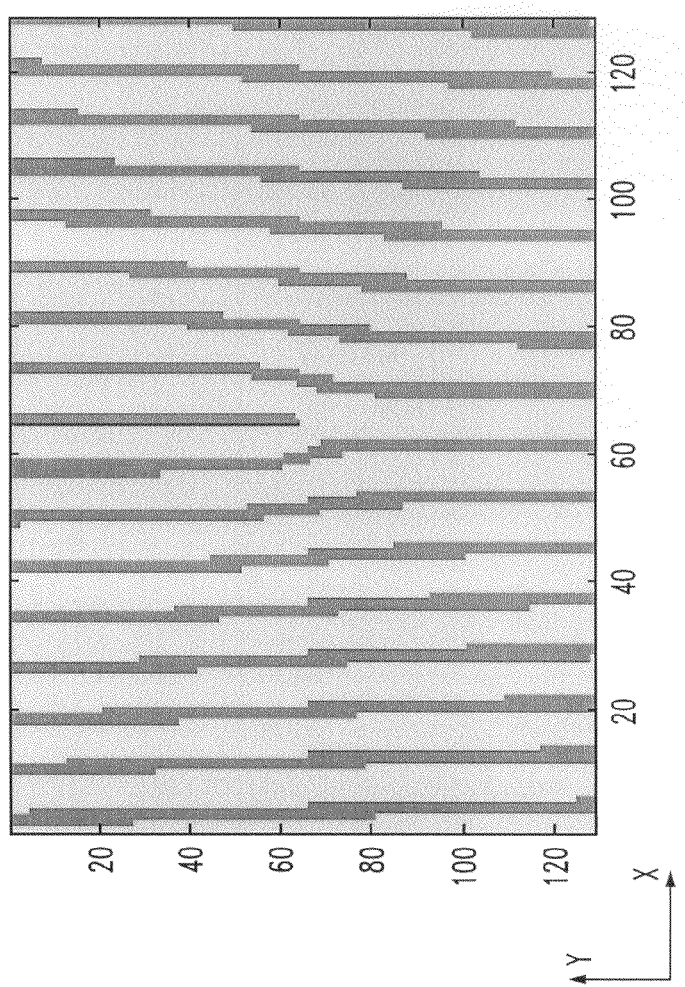
FIG. 4 shows a phase mask that can be used in the optical coupler of FIG. 3 according to one embodiment of the invention.

FIG. 4 shows a phase mask 400 that can be used as phase mask 330 according to one embodiment of the invention. Proper orientation of phase mask 400 is indicated by the X and Y coordinate axes, which correspond to the X and Y coordinate axes shown in FIG. 3. Phase mask 400 is a binary phase mask described by Eqs. (1a)-(1b):

$$\text{Phase} = \pi, \text{ for } \mod(kx+\phi, 2\pi) \geq A\pi \quad (1a)$$

$$\text{Phase} = 0, \text{ for } \mod(kx+\phi, 2\pi) < A\pi \quad (1b)$$

where x is the coordinate along the X axis; k and A are constants; φ is a polar angle corresponding to the polar axis that is located at coordinates (64,64) and is orthogonal to the plane of the drawing. Constant k determines the spatial period of the phase mask along the X axis. Constant A determines the relative widths of the stripes (e.g., troughs and ridges) corresponding to phase π and phase 0. In one implementation, k=100 mm$^{-1}$ and A=1.42. In general, the value of k is chosen so as to have at least 3 and preferably 50 or more spatial periods of phase mask 400 in the illuminated area of the mask. In one embodiment, phase mask 400 is a grooved glass plate, wherein the depth of the grooves is selected so as to produce a relative phase shift of π radians between a light ray traversing the glass plate through a trough and a light ray traversing the glass plate through a ridge.

FIGS. 5A-L illustrate the operation of optical coupler 300 when the coupler employs phase mask 400 as phase mask 330 (see FIG. 3). One unit of length along the X and Y axes in each of FIGS. 5A-L is 0.24 μm. FIGS. 5A-F show intensity and phase distributions in plane P1 at terminus 312 (see FIG. 3). The intensity distributions, which are shown in FIGS. 5A, 5C, and 5E, are color coded so that the blue represents zero light intensity, the red represents the highest light intensity, and the rainbow colors between red and blue represent intermediate light intensities in the decreasing order. The phase distributions, which are shown in FIGS. 5B, 5D, and 5F, are color coded so that different colors represent different phase shifts in a continuous 2π interval. In particular, FIG. 5F can be used as a key to the phase-shift color coding used in the figures. More specifically, the line that starts at the center point of FIG. 5F and separates the dark blue and the dark red colors in the figure corresponds to a zero phase shift (and also to a phase shift of 2π radians). The polar angle corresponding to that division line is zero. If one now draws another line originating at the center point, then the polar angle corresponding to that new line will give a corresponding phase-shift value while the color on that new line will give the color code for that phase-shift value.

FIGS. 5G-L show intensity and phase distributions in plane P2 (see FIG. 3). The intensity distributions, which are shown in FIGS. 5G, 5I, and 5K, are color coded similar to the intensity distributions shown in FIGS. 5A, 5C, and 5E. The phase distributions, which are shown in FIGS. 5B, 5D, and 5F, are color coded so that (i) different colors represent different phase shifts in a continuous 2π interval, wherein FIG. 5F can be used as the corresponding color-coding key, and (ii) different regions of the same color typically represent phase shifts that differ from one another by an integer multiple of 2π.

FIGS. 5A and 5B show intensity and phase distributions, respectively, corresponding to the LP01 transverse mode of multimode fiber 310. FIG. 5A indicates that the LP01 mode has a two-dimensional Gaussian-like intensity profile centered on the longitudinal axis of multimode fiber 310. FIG. 5B indicates that the LP01 mode also has a flat (constant) phase profile in plane P1. Traversing lens 320, phase mask 400 (which is used to implement phase mask 330), and lens 340 in optical coupler 300 transforms applied light corresponding to the "pure" LP01 mode of FIGS. 5A and 5B into resulting light at plane P2 having the intensity and phase distributions shown in FIGS. 5G and 5H, respectively.

FIG. 5G indicates that, in plane P2, the intensity distribution corresponding to the LP01 mode has a relatively bright spot having a two-dimensional Gaussian-like intensity profile centered at coordinates (1000,1000), i.e., at terminus 362$_2$ of single-mode fiber 360$_2$. This feature of the intensity distribution helps to produce efficient optical-energy transfer from the LP01 mode of multimode fiber 310 to single-mode fiber 360$_2$. The intensity distribution of FIG. 5G also has several fairly faint rings located along the line that is parallel to the X axis and that passes through the brightest spot at coordinates (1000,1000). Note that the dark centers of the brightest two of these faint rings are located at coordinates (750,1000) and (1250,1000), respectively, i.e., at termini 362$_1$ and 362$_3$ of single-mode fibers 360$_1$ and 360$_3$, respectively. This feature of the intensity distribution helps to inhibit optical-energy transfer from the LP01 mode of multimode fiber 310 to single-mode fibers 360$_1$ and 360$_3$.

FIG. 5H indicates that, in plane P2, the phase distribution corresponding to the LP01 mode has a flat spot centered at coordinates (1000,1000), i.e., at terminus 362$_2$ of single-mode fiber 360$_2$. This feature of the phase distribution further helps to produce efficient optical-energy transfer from the LP01 mode of multimode fiber 310 to single-mode fiber 360$_2$. The phase distribution of FIG. 5H also has two screw-shaped portions located at coordinates (750,1000) and (1250,1000), respectively, i.e., at termini 362$_1$ and 362$_3$. This feature of the phase distribution causes effective phase scrambling at each of termini 362$_1$ and 362$_3$, which further helps to inhibit optical-energy transfer from the LP01 mode of multimode fiber 310 to fibers 360$_1$ and 360$_3$.

FIGS. 5C and 5D show the intensity and phase distributions, respectively, corresponding to the LP11 transverse mode of multimode fiber 310. FIG. 5C indicates that the LP11 mode has a doughnut-shaped intensity profile centered on the longitudinal axis of multimode fiber 310. FIG. 5D indicates that the LP11 mode has a counterclockwise azimuthal phase pattern having a total phase range of 2c. Traversing lens 320, phase mask 400, and lens 340 in optical coupler 300 transforms applied light corresponding to the "pure" LP11 mode of FIGS. 5C and 5D into resulting light at plane P2 having the intensity and phase distributions shown in FIGS. 5I and 5J, respectively.

FIG. 5I indicates that, in plane P2, the intensity distribution corresponding to the LP11 mode has a relatively bright spot having a two-dimensional Gaussian-like intensity profile centered at coordinates (750,1000), i.e., at terminus 362$_1$ of single-mode fiber 360$_1$. This feature of the intensity distribution helps to produce efficient optical-energy transfer from the LP11 mode of multimode fiber 310 to single-mode fiber 360$_1$. The intensity distribution of FIG. 5I also has several fairly faint rings located along the line that passes through the bright spot parallel to the X axis. The centers of two of the rings are located at coordinates (1000,1000) and (1250,1000), respectively, i.e., at termini 362$_2$ and 362$_3$. This feature of the intensity distribution helps to inhibit optical-energy transfer from the LP11 mode of multimode fiber 310 to single-mode fibers 360$_2$ and 360$_3$.

FIG. 5J indicates that, in plane P2, the phase distribution corresponding to the LP11 mode has a (medium shade of red) flat spot surrounded by a (medium shade of blue) flat ring, both centered at coordinates (750,1000), i.e., at terminus 362$_1$ of single-mode fiber 360$_1$. The phase difference between the flat spot and the flat ring is about π radians. Although the light corresponding to the flat ring is primarily located outside the core of single-mode fiber 360$_1$, this light can still cause some destructive-interference-related reduction in the light-coupling efficiency. However, a properly designed A/P filter 350$_1$ can be used to mitigate the detrimental effects of destructive interference. For example, in one implementation, A/P filter 350$_1$ can be an iris that blocks the light corresponding to the flat ring while letting through the light corresponding to the flat spot. All these features further help to produce efficient optical-energy transfer from the LP11 mode of multimode fiber 310 to single-mode fiber $360_1$.

The phase distribution of FIG. 5J also has two screw-shaped portions located at coordinates (1000,1000) and (1250,1000), respectively, i.e., at termini $362_2$ and $362_3$. This feature of the phase distribution causes effective phase scrambling at each of termini $362_2$ and $362_3$, which further helps to inhibit optical-energy transfer from the LP11 mode of multimode fiber 310 to fibers $360_2$ and $360_3$.

FIGS. 5E and 5F show the intensity and phase distributions, respectively, corresponding to the LP11* mode of multimode fiber 310. The LP11* mode differs from the LP11 mode in that the former has a clockwise azimuthal phase pattern while the latter has a counterclockwise azimuthal phase pattern. FIG. 5E indicates that the LP11* mode has a doughnut-shaped intensity profile centered on the longitudinal axis of multimode fiber 310, which intensity profile is similar to the intensity profile of FIG. 5C (corresponding to the LP11 mode). FIG. 5F shows the clockwise azimuthal phase pattern of the LP11* mode. Traversing lens 320, phase mask 400, and lens 340 in optical coupler 300 transforms applied light corresponding to the "pure" LP11* mode of FIGS. 5E and 5F into resulting light at plane P2 having the intensity and phase distributions shown in FIGS. 5K and 5L, respectively.

FIG. 5K indicates that, in plane P2, the intensity distribution corresponding to the LP11* mode has a relatively bright spot having a two-dimensional Gaussian-like intensity profile centered at coordinates (1250,1000), i.e., at terminus $362_3$ of single-mode fiber $360_3$. This feature of the intensity distribution helps to produce efficient optical-energy transfer from the LP11* mode of multimode fiber 310 to single-mode fiber $360_3$. The intensity distribution of FIG. 5K also has several fairly faint rings located along the line that passes through the bright spot parallel to the X axis. The centers of two of the rings are located at coordinates (1000,1000) and (750,1000), respectively, i.e., at termini $362_1$ and $362_2$. This feature of the intensity distribution helps to inhibit optical-energy transfer from the LP11* mode of multimode fiber 310 to single-mode fibers $360_1$ and $360_2$.

FIG. 5L indicates that, in plane P2, the phase distribution corresponding to the LP11* mode has a (dark-to-medium shade of blue) flat spot surrounded by a (yellow) flat ring, both centered at coordinates (1250,1000), i.e., at terminus $362_3$ of single-mode fiber $360_3$. Since this phase pattern is qualitatively similar to that present at coordinates (750,1000) in FIG. 5J, an A/P filter $350_3$ that is similar to the above-described A/P filter $350_1$ can be used to mitigate detrimental effects of destructive interference to ensure efficient optical-energy transfer from the LP11* mode of multimode fiber 310 to single-mode fiber $360_3$.

The phase distribution of FIG. 5L also has two screw-shaped portions located at coordinates (1000,1000) and (750, 1000), respectively, i.e., at termini $362_2$ and $362_1$. This feature of the phase distribution causes effective phase scrambling at each of termini $362_2$ and $362_1$, which further helps to inhibit optical-energy transfer from the LP11* mode of multimode fiber 310 to fibers $360_2$ and $360_1$.

Table 1 shows representative performance characteristics for the above-described configuration of optical coupler 300. More specifically, the numbers shown in each of the second, third, and fourth columns represent the coupling efficiencies for optical-energy transfer between the transverse mode indicated at the top of the column and the single-mode fiber indicated in the corresponding row of the first column.

TABLE 1

Representative Performance Characteristics for Coupler 300

| | LP01 | LP11 | LP11* |
|---|---|---|---|
| Fiber $360_2$ | 17.3% | 0.1% | 0.01% |
| Fiber $360_1$ | 0.14% | 15.5% | 0.01% |
| Fiber $360_3$ | 0.08% | 0.01% | 15.4% |

For example, for the LP01 mode of multimode fiber 310, about 17.3% of the optical energy of the LP01 mode is coupled into single-mode fiber $360_2$; about 0.14% of the optical energy of the LP01 mode is coupled into single-mode fiber $360_1$; and about 0.08% of the optical energy of the LP01 mode is coupled into single-mode fiber $360_3$. The optical energy that is unaccounted for in Table 1 represents the optical-coupling loss in coupler 300.

Figure 6:
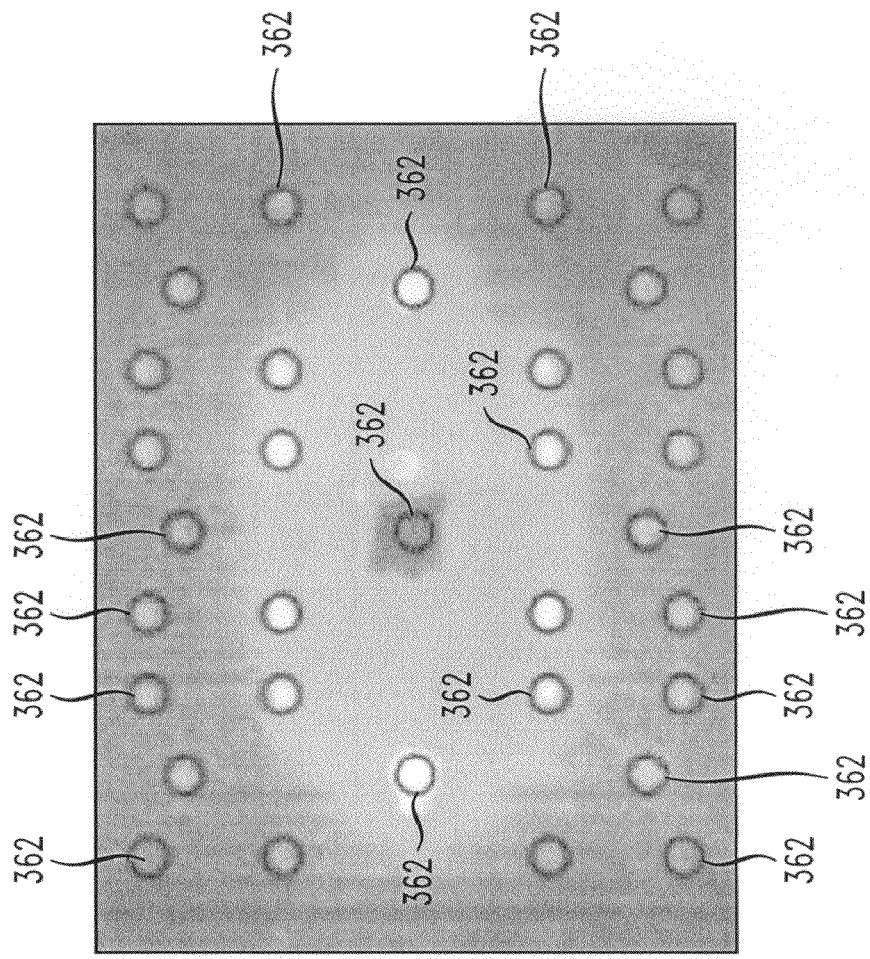
FIG. 6 shows a front view of a two-dimensional array of single-mode fibers that can be used in the optical coupler of FIG. 3 according to one embodiment of the invention.

FIG. 6 schematically shows a front view of a two-dimensional (2D) array 600 of single-mode fibers 360 that can be used in optical coupler 300 according to one embodiment of the invention. More specifically, the view of FIG. 6 shows termini 362 of single-mode fibers 360 as they would be seen from lens 340 (see FIG. 3). Array 600 has thirty three single-mode fibers 360 arranged as indicated in FIG. 6. One skilled in the art will understand that the 2D pattern of the arrangement depends on the properties of the corresponding phase mask 330 used in optical coupler 300. More specifically, each terminus 362 is placed in plane P2 at the location of the bright spot produced by the corresponding transverse mode of multimode fiber 310, with each of the bright spots being analogous to the bright spots shown in FIGS. 5G, 5I, and 5K. In general, different phase masks 330 produce different linear or 2D spot patterns, thereby dictating the corresponding linear or 2D arrangements of termini 362 in plane P2.

Referring back to FIG. 3, in one embodiment, phase mask 330 is designed to cause selective coupling between different linear combinations of transverse modes of multimode fiber 310 and different respective single-mode fibers 360. For example, phase mask 330 can be designed to produce the following type of optical coupling between fibers 310 and 360. The optical energy of a first linear combination of selected transverse modes of multimode fiber 310 is primarily transferred to single-mode fiber $360_1$, while single-mode fibers $360_2$ and $360_3$ receive very little (if any) of that energy. Similarly, the optical energy of a second linear combination of the selected transverse modes of multimode fiber 310 is primarily transferred to single-mode fiber $360_2$, while single-mode fibers $360_1$ and $360_3$ receive very little of that energy. Finally, the optical energy of a third linear combination of the selected transverse modes of multimode fiber 310 is primarily transferred to single-mode fiber $360_3$, while single-mode fibers $360_1$ and $360_2$ receive very little (if any) of that energy. In one configuration, the first, second, and third linear combinations are mutually orthogonal in the sense that they can be a part of a basis set corresponding to multimode fiber 310.

In general, light propagation through a multimode fiber can be described using different alternative basis sets, each consisting of mutually orthogonal basis functions. One such basis set is a complete set of eigenfunctions of the multimode fiber, wherein each eigenfunction represents a different transverse mode. Any alternative basis set can be produced by applying a unitary transformation to the complete set of eigenfunctions. The previously described case of selective mode-to-waveguide coupling can be viewed as just one specific example of the more general case of selective coupling between different orthogonal basis functions (e.g., linear combinations of transverse modes) of multimode fiber 310 and different respective single-mode fibers 360. One skilled in the art will appreciate that, for some applications, it might be more convenient and/or advantageous to implement in optical coupler 300 a variant of this more-general type of selective coupling, rather than the above-described mode-to-waveguide coupling.

While this invention has been described with reference to illustrative embodiments, this description is not intended to be construed in a limiting sense. For example, although optical coupler 300 is described above in reference to fibers 360 being single mode fibers, the optical coupler can also operate when one or more fibers 360 are multimode fibers. In various embodiments, optical couplers of the invention can be implemented using one or more integrated waveguide circuits, free-space optics, and/or a combination thereof. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An optical apparatus, comprising:
   a first port for a first multimode waveguide;
   a second port for a plurality of second waveguides; and
   an optical phase mask that is disposed between the first port and the second port for optically coupling the first multimode waveguide and the plurality of second waveguides so that transverse modes of the multimode waveguide with different phase and/or intensity profiles are coupled to different respective waveguides of the plurality of second waveguides.

2. The apparatus of claim 1, wherein:
   the plurality of second waveguides comprises a first single-mode waveguide and a second single-mode waveguide; and
   for a first transverse mode of the first multimode waveguide, the optical phase mask transfers optical energy between the first transverse mode and the first single-mode waveguide while inhibiting energy transfer between the first transverse mode and the second single-mode waveguide.

3. The apparatus of claim 2, wherein, for a second transverse mode of the first multimode waveguide, the optical phase mask further transfers optical energy between the second transverse mode and the second single-mode waveguide while inhibiting energy transfer between the second transverse mode and the first single-mode waveguide.

4. The apparatus of claim 2, wherein:
   the plurality of second waveguides comprises a third single-mode waveguide; and
   for the first transverse mode of the first multimode waveguide, the optical phase mask also inhibits energy transfer between the first transverse mode and the third single-mode waveguide.

5. The apparatus of claim 1, further comprising:
   the first multimode waveguide; and
   the plurality of second waveguides.

6. The apparatus of claim 5, wherein the plurality of second waveguides comprises at least one multimode waveguide.

7. The apparatus of claim 5, wherein at least one of the first multimode waveguide and the second waveguides is removable from the corresponding port.

8. The apparatus of claim 1, wherein the optical phase mask is a digital phase mask.

9. The apparatus of claim 1, wherein the optical phase mask comprises a grooved plate.

10. The apparatus of claim 1, wherein the optical phase mask is a single unitary piece.

11. The apparatus of claim 1, wherein the optical phase mask is a spatial light modulator.

12. The apparatus of claim 1, further comprising an amplitude and/or phase (A/P) filter disposed between the optical phase mask and the second port.

13. The apparatus of claim 12, wherein the A/P filter is an iris that limits lateral size of an optical beam directed to or from a waveguide of the plurality of second waveguides.

14. The apparatus of claim 1, wherein at least one of the first multimode waveguide and the second waveguides is an optical fiber.

15. The apparatus of claim 1, wherein at least one of the first multimode waveguide and the second waveguides is part of an integrated waveguide circuit.

16. The apparatus of claim 1, wherein waveguide termini of the plurality of second waveguides are arranged in a two-dimensional array.

17. The apparatus of claim 1, wherein waveguide termini of the plurality of second waveguides are arranged in a linear array.

18. The apparatus of claim 1, further comprising:
a laser optically coupled to a plurality of third waveguides; and
a plurality of optical modulators, each configured to:
  receive light from the laser through a corresponding waveguide of the plurality of third waveguides;
  modulate the received light; and
  apply the modulated light to a corresponding waveguide of the plurality of second waveguides, which guides the modulated light toward the optical phase mask.

19. The apparatus of claim 1, further comprising:
an optical local oscillator (LO) source configured to generate an optical LO signal;
a plurality of coherent detectors, each optically coupled to a corresponding waveguide of the plurality of second waveguides and to the LO source and configured to:
  mix a light beam received from the corresponding waveguide of the plurality of second waveguides and the optical LO signal to generate one or more optical interference signals; and
  convert said one or more optical interference signals into one or more electrical signals indicative of an in-phase component and a quadrature-phase component of the light beam; and
a digital signal processor (DSP) operatively coupled to the plurality of coherent detectors and configured to process the electrical signals produced by the coherent detectors to recover data carried by the light beams received from the plurality of second waveguides.

* * * * *